(12) United States Patent
Edamana et al.

(10) Patent No.: US 10,818,947 B2
(45) Date of Patent: Oct. 27, 2020

(54) SYSTEMS AND METHODS FOR FUEL-CELL STACK FLOW CONTROL WITH SIMULTANEOUS LOAD FOLLOWING

(71) Applicant: GM Global Technology Operations LLC, Detroit, MI (US)

(72) Inventors: Biju Edamana, Troy, MI (US); Sergio E. Garcia, Commerce Township, MI (US); Jeffrey J. Gagliardo, Clarkston, MI (US); J. M. Ellenberger, Huntington Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 165 days.

(21) Appl. No.: 16/107,198

(22) Filed: Aug. 21, 2018

(65) Prior Publication Data
US 2020/0067109 A1    Feb. 27, 2020

(51) Int. Cl.
*H01M 8/04828* (2016.01)
*H01M 8/04858* (2016.01)
*H01M 8/04492* (2016.01)
*H01M 8/04537* (2016.01)
*H01M 8/0438* (2016.01)
*H01M 8/04746* (2016.01)

(52) U.S. Cl.
CPC ....... *H01M 8/0488* (2013.01); *H01M 8/0494* (2013.01); *H01M 8/04395* (2013.01); *H01M 8/04507* (2013.01); *H01M 8/04559* (2013.01); *H01M 8/04619* (2013.01); *H01M 8/04753* (2013.01); *H01M 8/04843* (2013.01)

(58) Field of Classification Search
CPC .................................................. H01M 8/0488
See application file for complete search history.

(56) References Cited

U.S. PATENT DOCUMENTS

| | | |
|---|---|---|
| 6,884,534 B2 | 4/2005 | Wheat et al. |
| 2002/0034669 A1 | 3/2002 | Kobayashi et al. |
| 2002/0106537 A1 | 8/2002 | Saito |
| 2004/0033396 A1 | 2/2004 | Thompson et al. |
| 2005/0197751 A1 | 9/2005 | Koike |
| 2006/0210849 A1 | 9/2006 | Bono |
| 2007/0087233 A1 | 4/2007 | Blaszczyk et al. |

(Continued)

*Primary Examiner* — Ula C Ruddock
*Assistant Examiner* — Thomas H. Parsons
(74) *Attorney, Agent, or Firm* — Quinn IP Law

(57) ABSTRACT

Systems, methods, and devices which optimize fuel-cell stack airflow control are described. According to aspects of the present disclosure, actuation of at least one cathode-flow actuator is initialized to an initial state based on a desired oxygen flowrate to operate the fuel-cell stack in a voltage-controlled mode, a stack current produced by the fuel-cell stack is determined that corresponds to operation at the actuation of the cathode-flow actuators, a flowrate of oxygen exiting the fuel-cell stack is calculated based on the stack current, the flowrate of oxygen exiting the fuel-cell stack is compared to the desired oxygen flowrate exiting the fuel-cell stack, and actuation of at least one of the cathode-flow actuators is modified in response to the flowrate of oxygen being different from the desired oxygen flowrate. The modified actuation reduces the difference between the desired oxygen flowrate and the flowrate of oxygen exiting the fuel-cell stack.

20 Claims, 4 Drawing Sheets

(56) References Cited

U.S. PATENT DOCUMENTS

2009/0098426 A1\* 4/2009 Tsuchiya ............ H01M 8/0438
  429/425
2010/0248044 A1 9/2010 Thampan et al.
2012/0251900 A1 10/2012 Sugawara et al.

\* cited by examiner

SYSTEMS AND METHODS FOR FUEL-CELL STACK FLOW CONTROL WITH SIMULTANEOUS LOAD FOLLOWING

INTRODUCTION

The disclosure relates to fuel-cell systems and, more specifically, to systems and methods for optimized fuel-cell stack airflow control.

Fuel cells may be used as an electrical power source in many applications. In particular, fuel cells are proposed for use in automobiles to replace internal combustion engines. Fuel cells are provided in stacks of individual fuel cells to provide desired levels of electrical power.

To operate a fuel-cell stack at a desired cathode stoichiometry, cathode-flow actuators are selectively actuated based on initial control models that are shared between similar systems. Nevertheless, accuracy of the determined airflow through the fuel-cell-stack stream is affected by a number of transient and non-transient disturbances such as ice blockages, debris blockages, and part-to-part variations introduced by manufacturing tolerances. These disturbances are not accounted for in the initial control models. To optimize measurement of airflow through the fuel-cell stack, flowrate sensors are generally added to one or both streams to account for flowrate differences introduced by the disturbances.

SUMMARY

It is desirable to reduce components employed by a system while optimizing accuracy of reactant flow control within a fuel-cell stack to account for various disturbances. These disturbances may include transient disturbances, such as ice blockages, substantially non-transient disturbances, such as debris accumulation, and non-transient disturbances such as part-to-part variation caused by manufacturing and assembly tolerances. Beneficially, systems and methods in accordance with the present disclosure provide for accurate stack airflow during operation of the fuel-cell stack using a stack-as-a-sensor approach.

According to aspects of the present disclosure, a method includes initializing actuation of at least one cathode-flow actuator to an initial state based on a desired oxygen flowrate to operate a fuel-cell stack in a voltage-controlled mode, determining, via at least one controller, a stack current produced by the fuel-cell stack that corresponds to operation at the actuation of the at least one cathode-flow actuator, calculating, via the at least one controller, a flowrate of oxygen exiting the fuel-cell stack based on the stack current, comparing, via the at least one controller, the flowrate of oxygen exiting the fuel-cell stack to the desired oxygen flowrate exiting the fuel-cell stack, and modifying, in response to the flowrate of oxygen being different from the desired oxygen flowrate, actuation of at least one of the cathode-flow actuators to reduce the difference between the desired oxygen flowrate and the flowrate of oxygen exiting the fuel-cell.

According to aspects of the present disclosure, a fuel-cell system includes a cathode flowpath, a fuel-cell stack including a cathode side defining a portion of the cathode flowpath, at least one cathode-flow actuator fluidly disposed in the cathode flowpath, and at least one controller operatively coupled to the at least one cathode-flow actuator. The at least one cathode-flow actuator is selectively actuated to alter flow of oxygen through the cathode side. The at least one controller is configured to initialize actuation of the at least one cathode-flow actuator to an initial state based on a desired oxygen flowrate to operate the fuel-cell stack in a voltage-controlled mode, determine a stack current produced by the fuel-cell stack that corresponds to operation at the actuation of the cathode-flow actuators, calculate a flowrate of oxygen exiting the fuel-cell stack based on the stack current, compare the flowrate of oxygen exiting the fuel-cell stack to the desired oxygen flowrate exiting the fuel-cell stack, and modify, in response to the flowrate of oxygen being different from the desired oxygen flowrate, actuation of at least one of the cathode-flow actuators to reduce the difference between the desired oxygen flowrate and the flowrate of oxygen exiting the fuel-cell stack.

According to aspects of the present disclosure, a power system, such as a vehicle or a stationary power system, includes a fuel-cell system. The fuel-cell system includes a cathode flowpath, a fuel-cell stack including a cathode side defining a portion of the cathode flowpath, at least one cathode-flow actuator fluidly disposed in the cathode flowpath, and at least one controller operatively coupled to the at least one cathode-flow actuator. The at least one cathode-flow actuator is selectively actuated to alter flow of oxygen through the cathode side. The at least one controller is configured to initialize actuation of the at least one cathode-flow actuator to an initial state based on a desired oxygen flowrate to operate the fuel-cell stack in a voltage-controlled mode, determine a stack current produced by the fuel-cell stack that corresponds to operation at the actuation of the cathode-flow actuators, calculate a flowrate of oxygen exiting the fuel-cell stack based on the stack current, compare the flowrate of oxygen exiting the fuel-cell stack to the desired oxygen flowrate exiting the fuel-cell stack, and modify, in response to the flowrate of oxygen being different from the desired oxygen flowrate, actuation of at least one of the cathode-flow actuators to reduce the difference between the desired oxygen flowrate and the flowrate of oxygen exiting the fuel-cell stack.

According to further aspects of the present disclosure, the method may further include repeatedly determining the stack current produced, calculating the flowrate of oxygen, comparing the flowrate of oxygen to the desired oxygen flowrate, and modifying actuation of the at least one of the at least one cathode-flow actuator or another of the at least one cathode-flow actuator until the difference between the desired oxygen flowrate and the flowrate of oxygen exiting the fuel-cell stack is below a predetermined threshold.

According to further aspects of the present disclosure, the controller may be further configured to repeatedly determine the stack current produced, calculate the flowrate of oxygen, compare the flowrate of oxygen to the desired oxygen flowrate, and modify actuation of the at least one of the at least one cathode-flow actuator or another of the at least one cathode-flow actuator until the difference between the desired oxygen flowrate and the flowrate of oxygen exiting the fuel-cell stack is below a predetermined threshold.

According to further aspects of the present disclosure, modifying actuation of at least one of the at least one cathode-flow actuator includes modifying actuation of a cathode backpressure valve.

According to further aspects of the present disclosure, modifying actuation of at least one of the at least one cathode-flow actuator includes modifying actuation of a cathode bypass valve.

According to further aspects of the present disclosure, calculating the flowrate of oxygen based on the stack current includes use of the equation:

$$\frac{62500 RTI^2 n_c^2 R_{O_2,FF-CL,ca} \chi_{N_2,Stck,in}}{F(A_{cell} F p_{tot} \chi_{O_2,Stck,in} - 250000 RTI n_c R_{O_2,FF-CL,ca} - A_{cell} FR H p_{sat} \chi_{O_2,Stck,in})}$$

where R is an ideal gas constant, T is a temperature of the fuel-cell stack, I is the stack current, $n_c$ is a number of fuel cells in the fuel-cell stack, $R_{O_2,FF-CL,ca}$ is an oxygen gas transport resistance from a respective channel to a respective electrode, $\chi_{N_2,Stck,in}$ is a mol fraction of nitrogen input to the fuel-cell stack, F is Faraday's constant, $A_{cell}$ is an active area of the fuel cells, $p_{tot}$ is a pressure input to a cathode side of the fuel-cell stack, $\chi_{O_2,Stck,in}$ is a mol fraction of oxygen input to the fuel-cell stack, RH is a relative humidity of the fuel-cell stack, and $p_{sat}$ is a saturation pressure.

According to further aspects of the present disclosure, operating the fuel-cell stack in the voltage-controlled mode includes operation at a low cathode stoichiometry.

According to further aspects of the present disclosure, the low cathode stoichiometry is about 1.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

Systems and methods in accordance with the present disclosure optimize accuracy of a determined reactant flow within a cathode side of a fuel-cell stack without individual sensors disposed within both a fuel-cell stack stream and a bypass stream. Systems and methods in accordance with the present disclosure employ the fuel-cell stack as a sensor by using existing data collected from the fuel-cell stack to provide airflow feedback. Systems and methods in accordance with the present disclosure may reject variations in flow due to transient disturbances, such as ice blockages. Further, systems and methods in accordance with the present disclosure may be used to optimize robustness of stack control to determine and account for airflow variation caused by part-to-part variations. Yet further, systems and methods in accordance with the present disclosure may be used to optimize accuracy of load-following capability.

Figure 1:
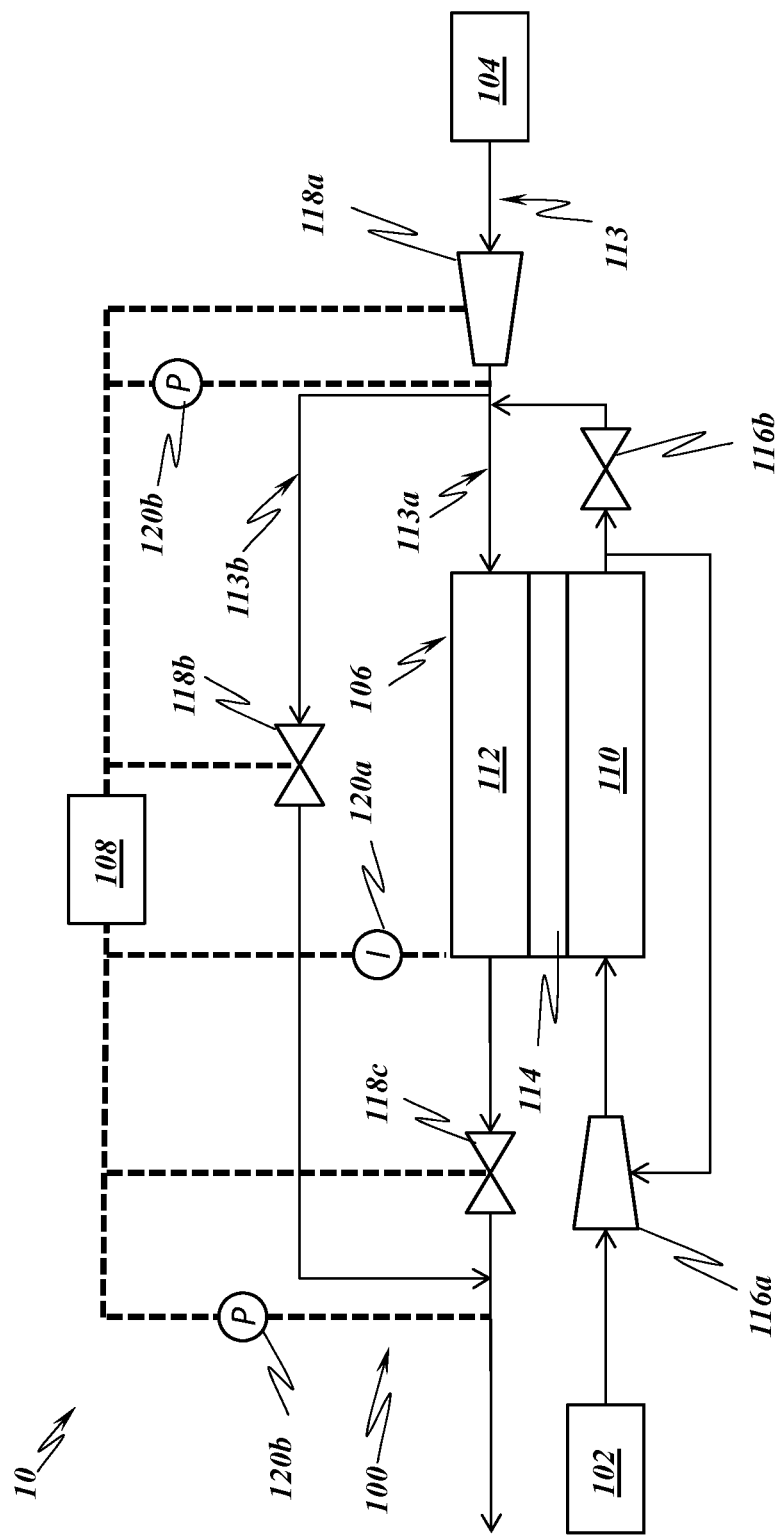
FIG. 1 is a schematic illustration of a fuel-cell system, according to aspects of the present disclosure.

FIG. 1 illustrates a schematic diagram of a fuel-cell system 100 within a vehicle 10. The fuel-cell system 100 includes a fuel source 102, an oxidant source 104, a fuel-cell stack 106, and a controller 108.

The fuel source 102 and the oxidant source 104 provide reactants to the fuel-cell system 100 for generating electrical energy through chemical reactions. As used herein, "reactants" may refer to fuels, oxidants, or both as the context dictates. The reactants include a suitable fuel and oxidant combination. For example, the fuel is hydrogen and the oxidant is oxygen. Other fuels may be used such as natural gas, methanol, gasoline, and coal-derived synthetic fuels, for example. The oxygen may be provided by air drawn from the ambient environment.

The fuel-cell stack 106 receives the reactants and facilitates production of electrical energy by promoting redox reactions. For example, hydrogen fuel may be reacted with oxygen to produce electricity with heat and water as by-products. The fuel-cell stack 106 includes an anode side 110 and a cathode side 112 separated by one or more membranes 114. The anode side 110 is fluidly coupled to the fuel source 102, and the cathode side 112 is fluidly coupled to the oxidant source 104 via a cathode flowpath 113. The cathode flowpath 113 extends from the oxidant source 104 to a cathode exhaust. The cathode flowpath 113 splits into a bypass stream 113a and a cathode stream 113b.

The system 100 further includes anode-flow actuators 116a-b and cathode-flow actuators 118a-c. The anode flow actuators 116a-b are selectively actuated to increase or decrease flow of the fuel through the anode side 110 of the fuel-cell stack 106. The anode flow actuators 116a-b may include a fuel compressor 116a and an anode purge valve 116b.

The cathode-flow actuators 118a-c are selectively actuated to increase or decrease flow of the oxidant through the cathode side 112 of the fuel-cell stack 106. The cathode-flow actuators 118a-c may include a compressor 118a, a cathode bypass valve 118b, and/or a backpressure valve 118c. The bypass stream 113a, when the bypass valve 118b is not closed, carries an amount of the oxidant around the fuel cell stack 106. The cathode stream 113b, when the backpressure valve 118c is not closed, carries an amount of oxidant through the cathode side 112 of the fuel-cell stack 106 to react with the fuel flowing through the anode side 110.

The controller 108 is operatively coupled to one or more of the cathode-flow actuators 118a-c and one or more sensors 120a-b. The one or more sensors include a sensor 120a that provides a signal corresponding to a current produced by the fuel-cell stack 106. The one or more sensors may further include sensors 120b that provide a signal corresponding to a pressure of fluid at a corresponding portion of the cathode flowpath 113.

The controller 108 provides signals to the cathode-flow actuators 118a-c coupled thereto that alter a state of the cathode-flow actuators 118a-c, for example a rotational speed of the compressor 118a or a valve position of the cathode bypass valve 118b or the backpressure valve 118c. The controller 108 includes a module having at least one valve control profile. The valve control profiles correlate flow behavior with respective valve states within the system 100.

The controller 108 may include hardware elements such as a processor, memory, circuitry including but not limited to a timer, oscillator, analog-to-digital (A/D) circuitry, digital-to-analog (D/A) circuitry, a digital signal processor, and input/output (I/O) devices and other signal conditioning and/or buffer circuitry. The memory may include tangible, non-transitory memory such as read only memory (ROM), e.g., magnetic, solid-state/flash, and/or optical memory, as well as sufficient amounts of random access memory (RAM), electrically-erasable programmable read-only memory (EEPROM), and the like. Methods, such as method 300 (described with reference to FIG. 3), may be stored in memory and executed by the processor in the overall control of the fuel-cell system 100 or components thereof.

Figure 2:
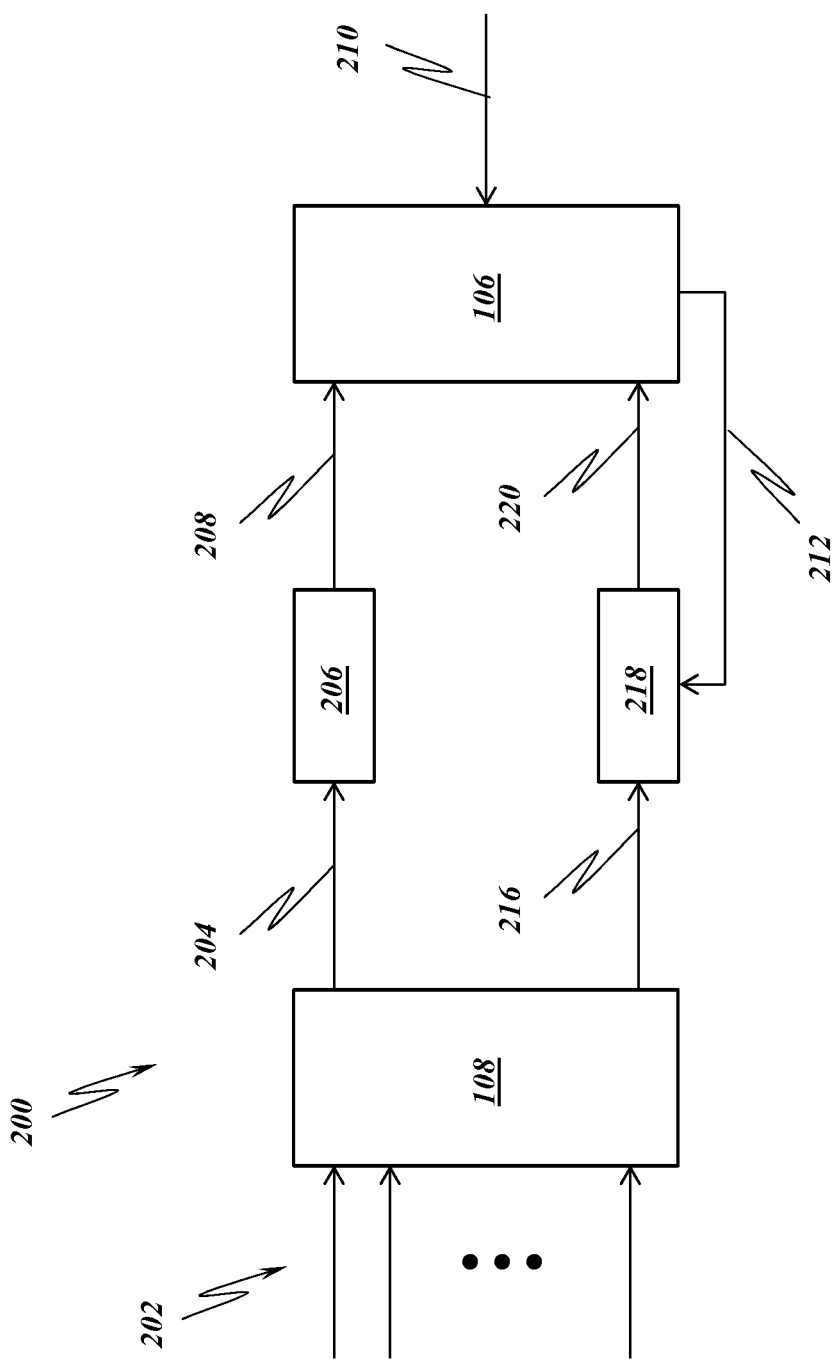
FIG. 2 is a schematic diagram of signals and inputs within the system of FIG. 1.

FIG. 2 illustrates a schematic diagram 200 of signals and inputs within the system 100. The controller 108 receives one or more inputs 202, such as a net power request, a heat generation request, or the like. From the received inputs 202, the controller 108 determines a voltage set point 204 including a desired voltage to be maintained while operating under voltage-controlled mode. During the voltage-controlled mode, an average stack voltage and a current produced by the fuel-cell stack 106 are a function of oxygen ($O_2$) available while the hydrogen ($H_2$) available is maintained above the reaction-limiting amount. During standard operation modes, the fuel-cell system 100 provides an amount of airflow to the fuel-cell stack 106 and boost control module 206 maintains voltage by actuating other changes in the fuel-cell system 100.

While under voltage-controlled mode, the voltage set point 204 is provided to a boost control module 206. The boost control module 206 receives the voltage set point and determines initial operating conditions 208 for the fuel-cell stack 106 that are used in controlling actuation of one or more of the cathode-flow actuators 118a-c. The initial operating conditions 208 may be provided by, for example, laboratory tests, calculated models such as an orifice model, and the like.

The fuel-cell stack 106 also receives disturbances 210 that change flow conditions through the cathode side 112 of the fuel-cell stack 106 from the initial operating conditions 208 determined by the boost control module 206. The disturbances may include transient disturbances (e.g., ice blockages), substantially non-transient disturbances (e.g., debris aggregation), and non-transient disturbances (e.g., part-to-part variations). For example, an ice blockage will inhibit fluid flow therearound until the heat load proximate the ice blockage melts the ice blockage. Further, debris aggregation will inhibit fluid flow therearound unless remediated by, for example, an increase of flow velocity to a level sufficient to dislodge the debris or through mechanical or chemical interventions. Part-to-part variations may either promote or inhibit flow therethrough by creating wider or narrower passages that are not typically remediable. This may result in higher or lower flowrates than expected under the initial operating conditions 208.

The fuel-cell stack 106 outputs a stack current 212 that may be measured by one or more sensors, such as sensor 120a. The stack current 212 and a current set point 216 are provided to a cathode-flow correction module 218. The cathode-flow correction module 218 determines modified operating conditions 220 for the fuel-cell stack 106 that are used to modify actuation of one or more of the cathode-flow actuators 118a-c. The cathode-flow correction module 218 may continually receive updated values of the stack current 212 and continually determine further modified operating conditions 220 for the fuel-cell stack 106 that may be used to further modify actuation of one or more of the cathode-flow actuators 118a-c.

Stack voltage is a function of cathode stoichiometry. Cathode stoichiometry is the flowrate of oxygen through the cathode side 112 of the fuel-cell stack 106 divided by the rate of oxygen consumption within the cathode side of the fuel-cell stack 106. During standard operation modes, the cathode stoichiometry is maintained at a high cathode stoichiometry, such as a cathode stoichiometry of at least 1.5. In some aspects, the high stoichiometry is a cathode stoichiometry of at least 1.8. In some aspects, during voltage-controlled operation modes, the cathode stoichiometry is maintained at a low cathode stoichiometry, such as a cathode stoichiometry less than 1.3. In some aspects, the low cathode stoichiometry is a cathode stoichiometry of about 1. As used herein, "about" means within 5% of the value.

Oxygen is substantially depleted during the voltage-controlled operation modes, e.g., with a cathode stoichiometry of about 1, because the actual flow rate of the oxygen is approximately the same as the rate of the consumption of oxygen by the fuel-cell stack 106 to generate the desired electrical properties such as current and voltage. Maintaining the low cathode stoichiometry may be achieved by adjusting cathode-flow actuators 118a-c to adjust flow of oxygen through the cathode side 112 of the fuel-cell stack 106.

Importantly, under-stoichiometry operation should be avoided. An under cathode stoichiometry is where the anode side of the fuel cell stack provides more electrons than are consumed by production of water, which is limited by the flow of oxygen. During under-stoichiometry operation, protons recombine on the cathode side to produce diatomic hydrogen within the cathode flowpath, which may exit to the atmosphere through the cathode exhaust gas line. This should be avoided because excess hydrogen present in the cathode exhaust may cause hydrogen emission constraints to be exceeded.

Figure 3:
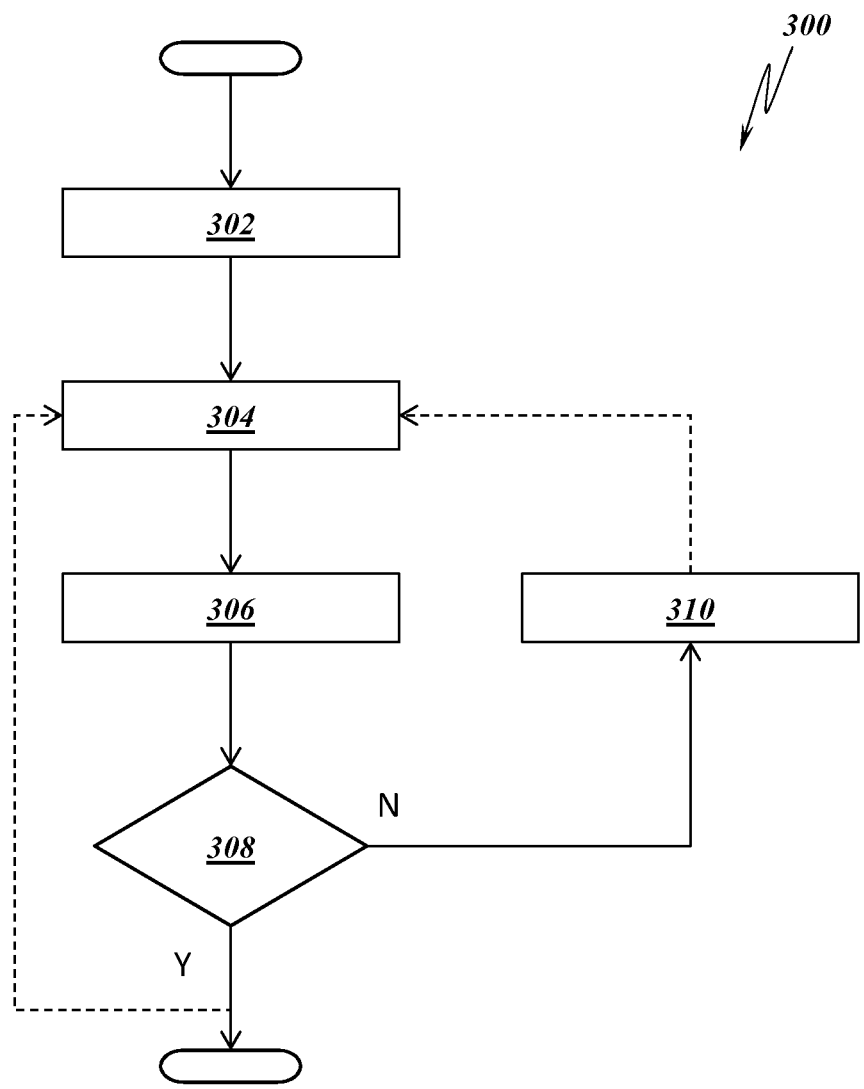
FIG. 3 is a flowchart of a method of optimizing airflow control using a stack-as-a-sensor approach.

FIG. 3 illustrates a method 300 of optimizing airflow control within a cathode side 112 of a fuel-cell stack 106. The method 300 includes initializing 302 actuation of the at least one cathode-flow actuator 118a-c to an initial state based on a desired oxygen flow rate to operate the fuel-cell stack in a voltage-controlled mode. The method 300 further includes determining 304 a current produced by the fuel-cell stack 106 while operating at the predetermined actuation of the cathode-flow actuators 118a-c. The method 300 then proceeds to calculating 306, using the determined current, a flowrate of oxygen exiting the fuel-cell stack 106. The method 300 further includes comparing 308 the calculated flowrate of oxygen exiting the fuel-cell stack 106 to a desired flowrate of oxygen exiting the fuel-cell stack 106. In response to the calculated flowrate of oxygen being different from the desired flowrate, the method 300 then proceeds to modifying 310 actuation of at least one of the cathode-flow actuators 118a-c to reduce the difference between the desired oxygen flowrate and the flowrate of oxygen exiting the fuel-cell stack 106. Optionally, the method 300 may then return to determining 304 the current produced by the fuel-cell stack 106. If the difference is below a predetermined threshold, the method 300 may end or may return to determining 304 the current produced by the fuel-cell stack 106.

In some aspects, the measured current is used to determine an amount of oxygen consumed, in mol/s, using the equation:

$$\dot{n}_{O_2, consumed} = \frac{n_c I}{4F} \quad (1)$$

where $n_c$ is the number of fuel cells in the fuel-cell stack 106, I is the measured current of the fuel-cell stack 106 in amps, and F is Faraday's constant in coulombs/mole.

For steady state operation, the amount of oxygen consumed in the cathode side 112 may be calculated using the partial pressures of oxygen in channels of the fuel cells ($p_{O_2,FF,ca}$) relative to the electrode ($p_{O_2,CL,ca}$) in Pascals (Pa). Thus, equation (1) may be rewritten as:

$$\dot{n}_{O_2,consumed} = \frac{A_{cell}(p_{O_2,FF,ca} - p_{O_2,CL,ca}) \times 10^{-6}}{RT R_{O_2,FF-CL,ca}} \quad (2)$$

where R is the gas constant in J mol$^{-1}$ K$^{-1}$, T is temperature in Kelvin, $A_{cell}$ is the active area of the cell in cm$^2$, and $R_{O_2,FF-CL,ca}$ is the oxygen gas transport resistance from the channel to the electrode.

The oxygen gas transport resistance from the channel to the electrode is given by:

$$R_{O_2,FF-CL,ca} = \frac{1}{h_{O_2,FF,ca}} + \frac{f_{DM,ca}\delta_{DM,ca}}{D_{O_2,DM,ca}^{eff}} + \frac{\delta_{CL,ca}^{eff}}{D_{O_2,CL,ca}^{eff}} \quad (3)$$

where calculations and estimations of the various terms are given below.

The first term in Equation (3) is the channel contribution, and $h_{O_2,FF,ca}$ is the convective mass transfer coefficient at the interface of the diffusion media such that:

$$h_{O_2,FF,ca} = \frac{Sh D_{O_2} r_{CtoP}}{d} \quad (4)$$

where Sh is the Sherwood number, $D_{O_2}$ is the diffusion coefficient for oxygen, $r_{CtoP}$ is the fraction of exposed diffusion media surface under the channel to the channel pitch, and d is the channel depth.

$D_{O_2}$ may be calculated using the Wilke formula, found in Wilke, C. R A Viscosity Equation for Gas Mixtures. J. Chem. Phys., v. 18, 1950, pp. 517-519, which is hereby incorporated by reference in its entirety.

The second term in Equation (3) represents the diffusion media contribution to the transport resistance, where $f_{DM,ca}$ is the geometric correction factor accounting for the longer transport length from the channel to the electrode due to the flow field geometry, $\delta_{DM,ca}$ is the diffusion media thickness, and $D_{O_2,DM,ca}^{eff}$ is the effective diffusivity that accounts for the effect of porosity, $\epsilon$, and tortuosity, $\tau$. $D_{O_2,DM,ca}^{eff}$ may be determined by experiment, as would be recognized by one of ordinary skill in the art.

The third term in Equation (3) represents the catalyst layer contribution, where $\delta_{CL,ca}^{eff}$ is the effective transport length into the cathode catalyst layer, and $D_{O_2,CL,ca}^{eff}$ is determined by:

$$D_{O_2,CL,ca}^{eff} = \epsilon_{CL}^{-1.5}\left(\frac{1}{D_{O_2,K}} + \frac{1}{D_{O_2}}\right)^{-1} \quad (5)$$

where $\epsilon_{CL}$ is the catalyst porosity, $D_{O_2,K}$ is the Knudsen diffusion term, and $D_{O_2}$ is calculated using the Wilke formula as described above.

The equations may be simplified using a number of assumptions. At low potentials, the cell generally operates at limiting current. The model assumes that the current represents the flux of oxygen to the catalyst layer and that the oxygen partial pressure in the catalyst layer is zero. Further, the model assumes that the cathode side 112 is operating at 100% relative humidity. Using these assumptions and simplifying the equations, the model calculates the molar flowrate of oxygen out of the fuel-cell stack 106 as:

$$\dot{n}_{O_2,Stckout} = \frac{62500 RT I^2 n_c^2 R_{O_2,FF-CL,ca} \chi_{N_2,Stck,in}}{F(A_{cell} F p_{tot} \chi_{O_2,Stck,in} - 250000 RT I n_c R_{O_2,FF-CL,ca} - A_{cell} F R H p_{sat} \chi_{O_2,Stck,in})} \quad (6)$$

where R is an ideal gas constant, T is a temperature of the fuel-cell stack, I is the stack current, $n_c$ is a number of fuel cells in the fuel-cell stack, $R_{O_2,FF-CL,ca}$ is an oxygen gas transport resistance from the channel to the electrode, $\chi_{N_2,Stck,in}$ is a mol fraction of nitrogen input to the fuel-cell stack, F is Faraday's constant, $A_{cell}$ is an active area of the fuel cells, $p_{tot}$ is a pressure input to a cathode side of the fuel-cell stack, $\chi_{O_2,Stck,in}$ is a mol fraction of oxygen input to the fuel-cell stack, RH is a relative humidity of the fuel-cell stack, and $p_{sat}$ is the saturation pressure.

The total flowrate out of the fuel-cell stack 106 may then be calculated using the equation:

$$\dot{n}_{Stck,out} = \dot{n}_{O_2,Stck,out} + \dot{n}_{N_2} \quad (7)$$

where $\dot{n}_{N_2}$ is the flow rate of nitrogen throughout the cathode side 112.

Figure 4A:
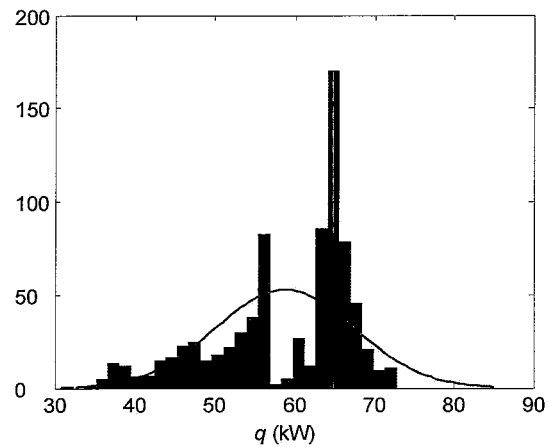
FIGS. 4A and 4B are histograms of data collected from a comparative fuel-cell system.
Figure 4B:
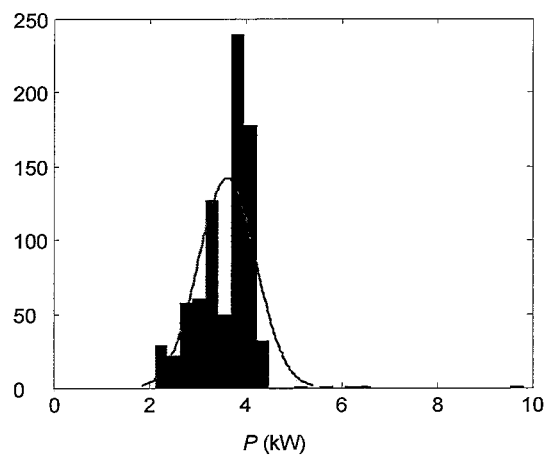

FIGS. 4A and 4B illustrate histograms of data obtained from testing a system that does not provide flow feedback based on current output of a fuel-cell stack. FIG. 4A illustrates a histogram of heat generated by the fuel-cell stack for a number of samples. As can be seen, the distribution extends between 0 kW and about 75 kW, with a break in the measured distribution at around 58 kW. FIG. 4B illustrates a histogram of power generated by the fuel-cell stack for a number of samples. As can be seen, the power generated spans from about 2 kW to about 7 kW.

Figure 5A:
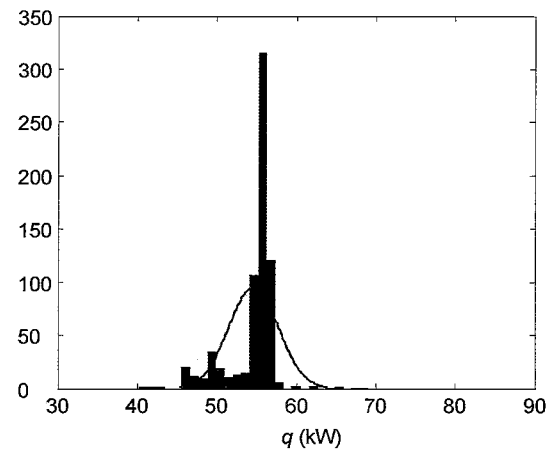
FIGS. 5A and 5B are histograms of data collected from an example fuel-cell system using a stack-as-a-sensor approach.
Figure 5B:
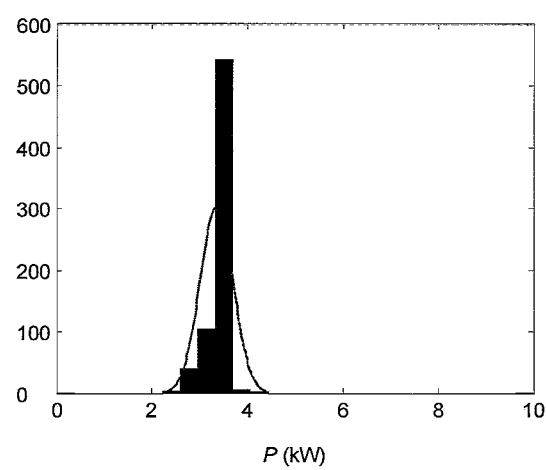

FIGS. 5A and 5B illustrate histograms of data obtained from the system 100 in accordance with the present disclosure. FIG. 5A illustrates a histogram of heat generated by the fuel-cell stack 106 used as a sensor for a number of samples. As can be seen, the distribution extends between about 40 kW and about 68 kW. Moreover, as can be seen, the distribution is much narrower and much more even than the distribution of samples in FIG. 4A. FIG. 5B illustrates a histogram of power generated by the fuel-cell stack 106 used as a sensor for a number of samples. As can be seen, the power generated spans from about 2 kW to about 4 kW. Similarly here, the distribution of FIG. 5B is much narrower than the distribution of FIG. 4B.

In some aspects, the calculated total flowrate out of the fuel-cell stack 106 is used to modify an actuation of one or more of the cathode-flow actuators 118a-c. In some aspects, the calculated total flowrate is used to modify a control profile of one or more of the cathode-flow actuators 118a-c, such as altering a gain of the controller 106. For example, the compressor 118a may be operated at constant conditions, the stack bypass valve 118b may be fully opened, and the backpressure valve 118c may be actuated for fine-control over flow through the cathode side 112.

In some aspects, the difference between the desired oxygen flow rate and the calculated flow rates is used to modify models for one or more of the cathode-flow actuators 118a-c used during operation under high cathode stoichiometry conditions. For example, if the difference remains consistent for longer than a predetermined period of time, then the difference may be considered as indicia of a non-transient disturbance. In some aspects, the predetermined period of time may be greater than one week. Beneficially, information about the non-transient disturbance, such as restricted or increased flow, that is obtained during voltage-controlled operation modes may be used to modify control profiles for the cathode-flow actuators 118a-c employed when operating the fuel-cell stack 106 under standard operation modes.

While the best modes for carrying out the disclosure have been described in detail, those familiar with the art to which this disclosure relates will recognize various alternative designs and embodiments for practicing the disclosure within the scope of the appended claims.

What is claimed is:

1. A method comprising:
    determining, via at least one controller, a voltage set point for operation of a fuel-cell stack in a voltage-controlled mode, wherein the fuel-cell has a cathode side and an anode side spaced apart from the cathode side by a membrane;
    actuating at least one cathode-flow actuator to an initial state based on the voltage set point and a desired oxygen flowrate through the cathode side;
    detecting a stack current produced by the fuel-cell stack that corresponds to operation of the at least one cathode-flow actuator at the initial state;
    calculating, via the at least one controller, a flowrate of oxygen through the cathode side based on the stack current, wherein the flowrate of oxygen is different from the desired oxygen flowrate;
    comparing, via the at least one controller, the flowrate of oxygen to the desired oxygen flowrate;
    modifying, in response to the flowrate of oxygen being different from the desired oxygen flowrate, actuation of the at least one cathode-flow actuator to reduce the difference between the desired oxygen flowrate and the flowrate of oxygen and thereby provide oxygen flow feedback without a flowrate sensor; and
    monitoring, via the at least one controller, a duration of the difference between the desired oxygen flowrate and the flowrate of oxygen to determine whether the difference remains consistent for longer than a predetermined period of time and thereby detect a disturbance in the desired oxygen flowrate from at least one of an ice blockage within the fuel-cell stack, a debris aggregation within the fuel-cell stack, and a manufacturing tolerance variation within the fuel-cell stack.

2. The method of claim 1, further comprising:
    repeatedly determining the stack current produced, calculating the flowrate of oxygen, comparing the flowrate of oxygen to the desired oxygen flowrate, and modifying actuation of the at least one cathode-flow actuator until the difference between the desired oxygen flowrate and the flowrate of oxygen is below a predetermined threshold.

3. The method of claim 1, wherein modifying actuation of the at least one cathode-flow actuator includes modifying actuation of a cathode backpressure valve.

4. The method of claim 1, wherein modifying actuation of the at least one cathode-flow actuator includes modifying actuation of a cathode bypass valve.

5. The method of claim 1, wherein calculating the flowrate of oxygen based on the stack current includes use of the equation:

$$\frac{62500 R T I^2 n_c^2 R_{O_2,FF-CL,ca} \chi_{N_2,Stck,in}}{F(A_{cell} F p_{tot} \chi_{O_2,Stck,in} - 250000 R T I n_c R_{O_2,FF-CL,ca} - A_{cell} F R H p_{sat} \chi_{O_2,Stck,in})}$$

where R is an ideal gas constant, T is a temperature of the fuel-cell stack, I is the stack current, $n_c$ is a number of fuel cells in the fuel-cell stack, $R_{O_2,FF-CL,ca}$ is an oxygen gas transport resistance from a respective channel to a respective electrode, $\chi_{N_2,Stck,in}$ is a mol fraction of nitrogen input to the fuel-cell stack, F is Faraday's constant, $A_{cell}$ is an active area of the fuel cells, $p_{tot}$ is a pressure input to the cathode side of the fuel-cell stack, $\chi_{O_2,Stck,in}$ is a mol fraction of oxygen input to the fuel-cell stack, RH is a relative humidity of the fuel-cell stack, and $p_{sat}$ is a saturation pressure.

6. The method of claim 1, wherein operating the fuel-cell stack in the voltage-controlled mode includes operation at a cathode stoichiometry of less than 1.3.

7. The method of claim 6, wherein the cathode stoichiometry is about 1.

8. A fuel-cell system comprising:
    a cathode flowpath;
    a fuel-cell stack including a cathode side defining a portion of the cathode flowpath;
    at least one cathode-flow actuator fluidly disposed in the cathode flowpath, the at least one cathode-flow actuator being selectively actuated to alter flow of oxygen through the cathode side; and
    at least one controller operatively coupled to the at least one cathode-flow actuator, the at least one controller configured to:
        determine a voltage set point for operation of the fuel-cell stack in a voltage-controlled mode;
        actuate the at least one cathode-flow actuator to an initial state based on the voltage set point and a desired oxygen flowrate through the cathode side;
        detect a stack current produced by the fuel-cell stack that corresponds to operation of the at least one cathode-flow actuator at the initial state;
        calculate a flowrate of oxygen through the cathode side based on the stack current, wherein the flowrate of oxygen is different from the desired oxygen flowrate;
        compare the flowrate of oxygen to the desired oxygen flowrate;
        modify, in response to the flowrate of oxygen being different from the desired oxygen flowrate, actuation of the at least one cathode-flow actuator to reduce the difference between the desired oxygen flowrate and the flowrate of oxygen and thereby provide oxygen flow feedback without a flowrate sensor; and
        monitor a duration of the difference between the desired oxygen flowrate and the flowrate of oxygen to determine whether the difference remains consistent for longer than a predetermined period of time and thereby detect a disturbance in the desired oxygen flowrate from at least one of an ice blockage within the fuel-cell stack, a debris aggregation within the fuel-cell stack, and a manufacturing tolerance variation within the fuel-cell stack.

9. The fuel-cell system of claim 8, wherein the at least one controller is further configured to repeatedly determine the stack current produced, calculate the flowrate of oxygen, compare the flowrate of oxygen to the desired oxygen flowrate, and modify actuation of the at least one cathode-flow actuator until the difference between the desired oxygen flowrate and the flowrate of oxygen exiting the fuel-cell stack is below a predetermined threshold.

10. The fuel-cell system of claim 8, wherein modifying actuation of the at least one cathode-flow actuator includes modifying actuation of a cathode backpressure valve.

11. The fuel-cell system of claim 8, wherein modifying actuation of the at least one cathode-flow actuator includes modifying actuation of a cathode bypass valve.

12. The fuel-cell system of claim 8, wherein calculating the flowrate of oxygen based on the stack current includes use of the equation:

$$\frac{62500RTI^2 n_c^2 R_{O_2,FF-CL,ca} \chi_{N_2,Stck,in}}{F(A_{cell}Fp_{tot}\chi_{O_2,Stck,in} - 250000RTIn_c R_{O_2,FF-CL,ca} - A_{cell}FRHp_{sat}\chi_{O_2,Stck,in})}$$

where R is an ideal gas constant, T is a temperature of the fuel-cell stack, I is the stack current, $n_c$ is a number of fuel cells in the fuel-cell stack, $R_{O_2,FF-CL,ca}$ is an oxygen gas transport resistance from a respective channel to a respective electrode, $\chi_{N_2,Stck,in}$ is a mol fraction of nitrogen input to the fuel-cell stack, F is Faraday's constant, $A_{cell}$ is an active area of the fuel cells, $p_{tot}$ is a pressure input to the cathode side of the fuel-cell stack, $\chi_{O_2,Stck,in}$ is a mol fraction of oxygen input to the fuel-cell stack, RH is a relative humidity of the fuel-cell stack, and $p_{sat}$ is the saturation pressure.

13. The fuel-cell system of claim 8, wherein the voltage-controlled mode includes operation of the fuel-cell stack at a cathode stoichiometry of less than 1.3.

14. The fuel-cell system of claim 13, wherein the cathode stoichiometry is about 1.

15. A power system comprising:
a fuel-cell system comprising:
  a cathode flowpath;
  a fuel-cell stack including a cathode side defining a portion of the cathode flowpath;
  at least one cathode-flow actuator fluidly disposed in the cathode flowpath, the at least one cathode-flow actuator being selectively actuated to alter flow of oxygen through the cathode side; and
  at least one controller operatively coupled to the at least one cathode-flow actuator, the at least one controller configured to:
    determine a voltage set point for operation of the fuel-cell stack in a voltage-controlled mode;
    actuate the at least one cathode-flow actuator to an initial state based on the voltage set point and a desired oxygen flowrate through the cathode side;
    detect a stack current produced by the fuel-cell stack that corresponds to operation of the at least one cathode-flow actuator at the initial state;
    calculate a flowrate of oxygen through the cathode side based on the stack current, wherein the flowrate of oxygen is different from the desired oxygen flowrate;
    compare the flowrate of oxygen to the desired oxygen flowrate;
    modify, in response to the flowrate of oxygen being different from the desired oxygen flowrate, actuation of the at least one cathode-flow actuator to reduce the difference between the desired oxygen flowrate and the flowrate of oxygen and thereby provide oxygen flow feedback without a flowrate sensor; and
    monitor a duration of the difference between the desired oxygen flowrate and the flowrate of oxygen to determine whether the difference remains consistent for longer than a predetermined period of time and thereby detect a disturbance in the desired oxygen flowrate from at least one of an ice blockage within the fuel-cell stack, a debris aggregation within the fuel-cell stack, and a manufacturing tolerance variation within the fuel-cell stack.

16. The power system of claim 15, wherein the at least one controller is further configured to repeatedly determine the stack current produced, calculate the flowrate of oxygen, compare the flowrate of oxygen to the desired oxygen flowrate, and modify actuation of the at least one cathode-flow actuator until the difference between the desired oxygen flowrate and the flowrate of oxygen is below a predetermined threshold.

17. The power system of claim 15, wherein modifying actuation of the at least one cathode-flow actuator includes modifying actuation of a cathode backpressure valve.

18. The power system of claim 15, wherein modifying actuation of the at least one cathode-flow actuator includes modifying actuation of a cathode bypass valve.

19. The power system of claim 15, wherein calculating the flowrate of oxygen based on the stack current includes use of the equation:

$$\frac{62500RTI^2 n_c^2 R_{O_2,FF-CL,ca} \chi_{N_2,Stck,in}}{F(A_{cell}Fp_{tot}\chi_{O_2,Stck,in} - 250000RTIn_c R_{O_2,FF-CL,ca} - A_{cell}FRHp_{sat}\chi_{O_2,Stck,in})}$$

where R is an ideal gas constant, T is a temperature of the fuel-cell stack, I is the stack current, $n_c$ is a number of fuel cells in the fuel-cell stack, $R_{O_2,FF-CL,ca}$ is an oxygen gas transport resistance from a respective channel to a respective electrode, $\chi_{N_2,Stck,in}$ is a mol fraction of nitrogen input to the fuel-cell stack, F is Faraday's constant, $A_{cell}$ is an active area of the fuel cells, $p_{tot}$ is a pressure input to the cathode side of the fuel-cell stack, $\chi_{O_2,Stck,in}$ is a mol fraction of oxygen input to the fuel-cell stack, RH is a relative humidity of the fuel-cell stack, and $p_{sat}$ is the saturation pressure.

20. The power system of claim 15, wherein the voltage-controlled mode includes operation of the fuel-cell stack at a cathode stoichiometry of less than 1.3.

* * * * *